Dec. 8, 1925.
J. B. SANDO
1,564,494
SAFETY COVER FOR CENTRIFUGAL MACHINES
Filed Dec. 30, 1921     3 Sheets-Sheet 2
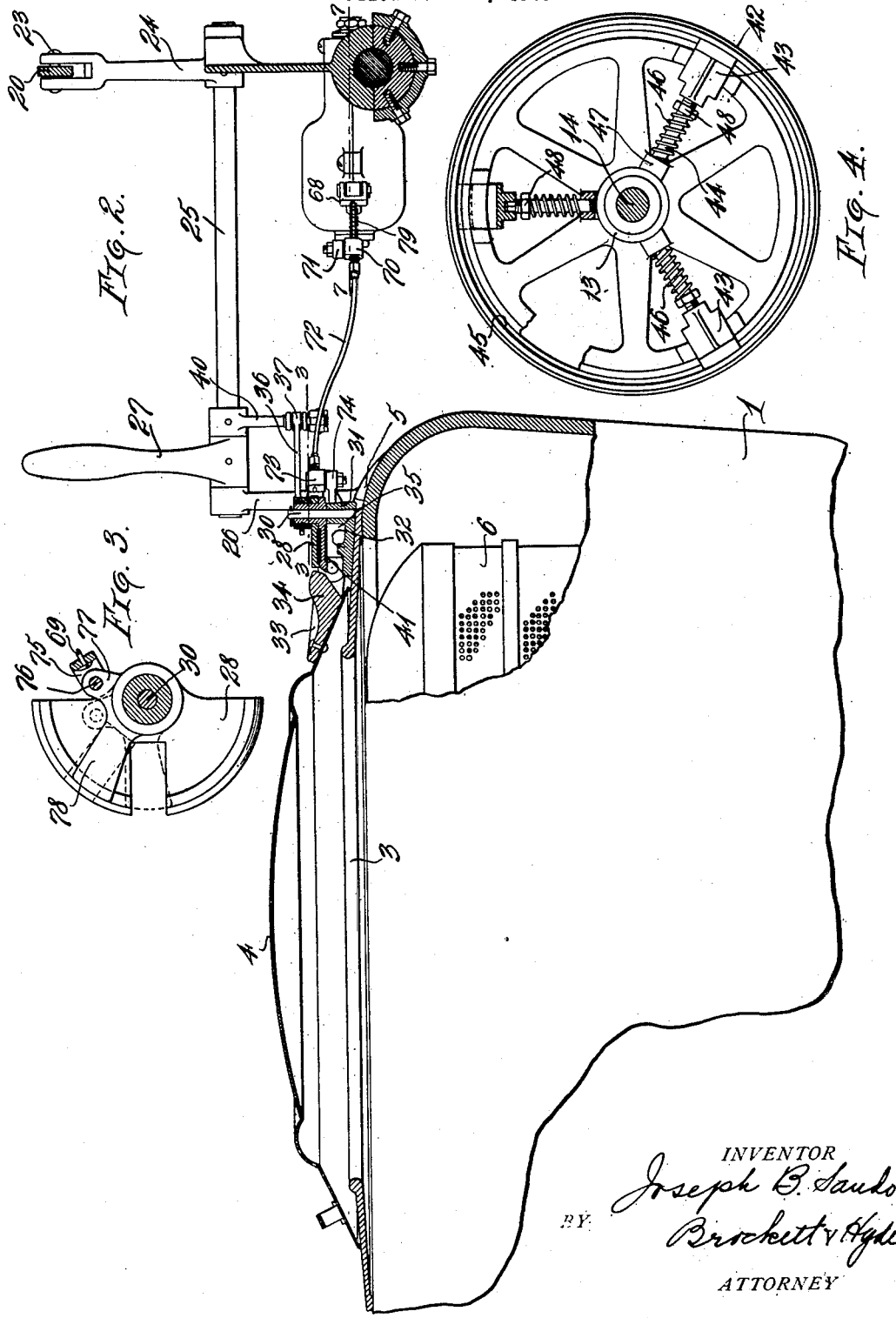
INVENTOR
Joseph B. Sando
BY Brickett & Hyde
ATTORNEY Dec. 8, 1925.
J. B. SANDO
1,564,494
SAFETY COVER FOR CENTRIFUGAL MACHINES
Filed Dec. 30, 1921    3 Sheets-Sheet 3
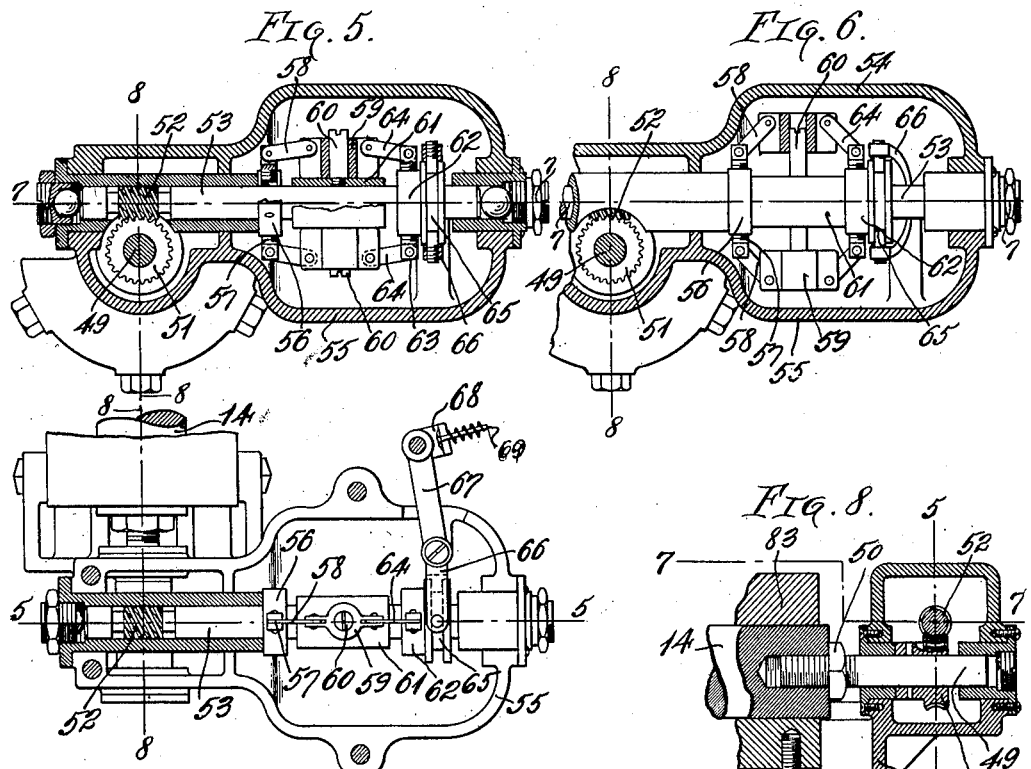
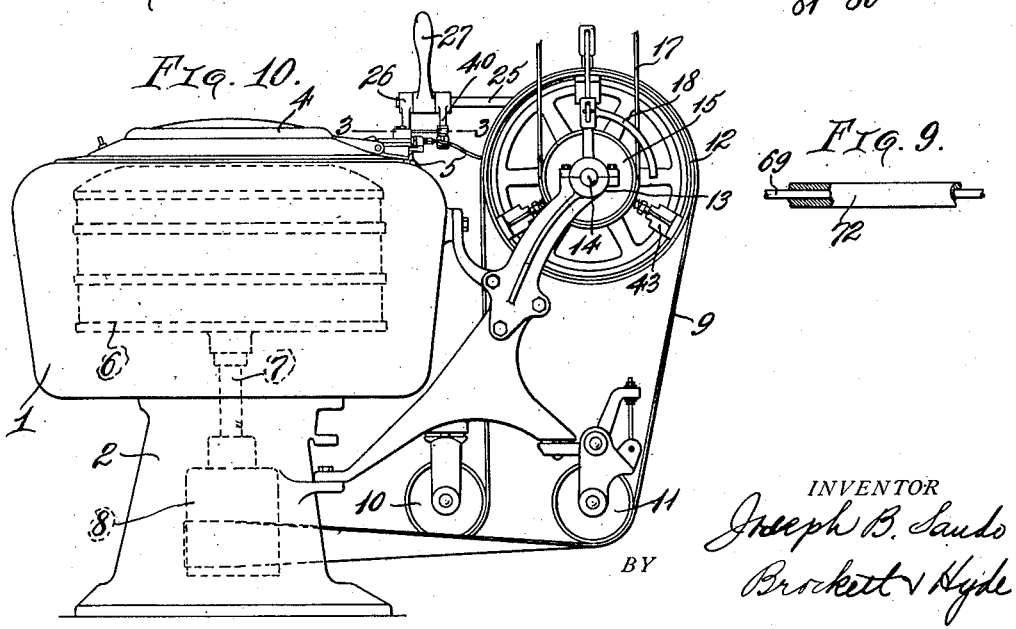
INVENTOR
Joseph B. Sando
BY Brockett & Hyde
ATTORNEY.

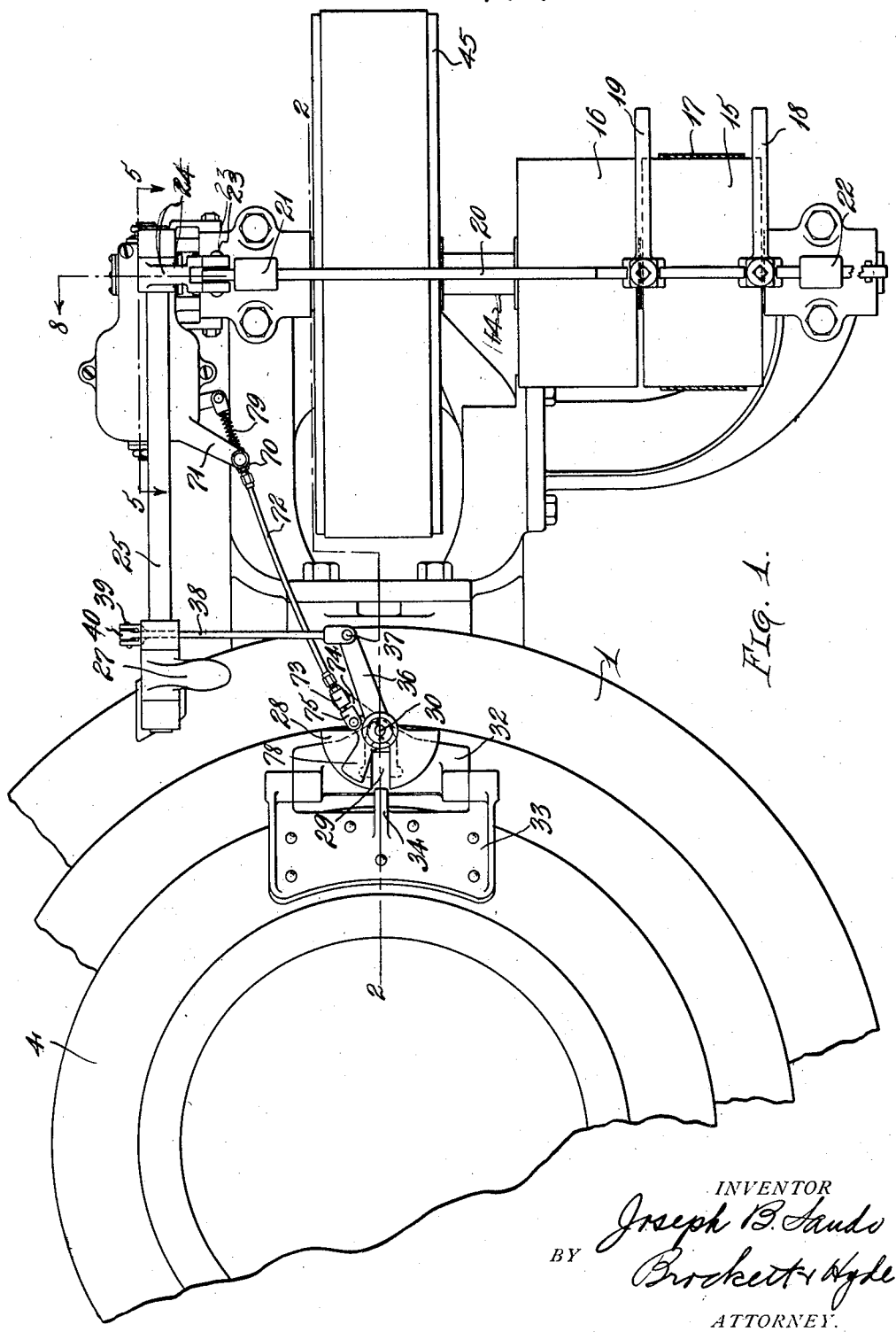

Patented Dec. 8, 1925.

1,564,494

UNITED STATES PATENT OFFICE.

JOSEPH B. SANDO, OF NORWOOD, OHIO, ASSIGNOR TO THE AMERICAN LAUNDRY MACHINERY COMPANY, OF CINCINNATI, OHIO, A CORPORATION OF OHIO.

SAFETY COVER FOR CENTRIFUGAL MACHINES.

Application filed December 30, 1921. Serial No. 526,045.

*To all whom it may concern:*

Be it known that I, JOSEPH B. SANDO, a citizen of the United States, residing at Norwood, in the county of Hamilton and State of Ohio, have invented certain new and useful Improvements in Safety Covers for Centrifugal Machines, of which the following is a specification.

This invention relates to improvements in safety devices for centrifugal extractors.

The objects of this invention are to provide a centrifugal extractor for use in laundry work with improved means for preventing opening of the cover during operative connection of the basket rotating means; to provide improved centrifugal means for preventing opening of the cover during rotation of the shaft beyond a predetermined rate of speed and whereby the basket will come to a stop before the cover can be opened; to provide such a device in which it is necessary to throw out the drive connection for the basket and for the basket to stop rotation before the cover can be opened; and more specifically, to provide a mechanism including a Bowden wire connection for automatically locking the cover closed upon establishing the drive connection between the motor and basket.

Other objects of the invention will be apparent from the following description and claims when considered together with the accompanying drawings.

Fig. 1 is a plan view of my device; Fig. 2 is a vertical section taken through the plane of line 2—2, Fig. 1; Fig. 3 is a transverse section taken through the plane of line 3—3, Figs. 2 and 10; Fig. 4 shows in elevation and partly in section the friction pulley; Fig. 5 is a section taken on line 5—5, Figs. 1, 7 and 8; Fig. 6 is a view similar to Fig. 5 with some parts in elevation; Fig. 7 is a section taken on line 7—7, Figs. 5, 6 and 8; Fig. 8 is a section taken on line 8—8, Figs. 5, 6 and 7; Fig. 9 shows a portion of the casing enclosing the Bowden wire; and Fig. 10 is a side elevation of my device.

The curb 1, which is supported by means of the standard 2, is provided with an opening 3 which is closed by cover 4 hinged to the ring 5 extending about the curb. The basket 6 is mounted upon the spindle 7 which in turn is rotated by means of the pulley 8 about which passes the belt 9. The belt 9 extends also about the idle pulleys 10 and 11 and the friction pulley indicated in a general way by reference numeral 12. The hub 13 of the friction pulley is fixed on the shaft 14 upon which shaft there are mounted also the loose pulley 15 and the pulley 16 which is fixed to the shaft. The belt 17 is shown in Fig. 1 as extending about the loose pulley 15 but it is adapted to be shifted to the fast pulley 16 when it is desired to set the machine in operation. This is accomplished by means of the fingers 18 and 19 carried by the reciprocatory bar 20, the end portions of which are adapted for movement through the brackets 21 and 22 suitably supported upon the frame. The one end of the bar 20 is pivotally connected at 23 to the upstanding arm 24 fixed to the rock shaft 25 which is suitably mounted in bearing supports on the frame work of the machine, as indicated for instance at 26. By means of the handle 27 fixed to the rock shaft 25, the arms 18 and 19 can be moved so as to shift the belt for operation of either of the pulleys 15 and 16. Movement of the handle 27 will also cause the substantially semicircular plate 28, which is provided with a cut-out portion 29, to assume such a position that it will prevent opening of the cover. The plate 28 is pivoted on the pin 30 which is fixed in the upstanding bearing portion 31 of the male hinge member 32, the other hinge member being indicated at 33 and being shown as provided with a lug 34 which is adapted to pass through the open portion 29 and into the opening 35 in the hinge member 32 when the plate 28 occupies the position indicated in Fig. 1. The arm 36 extends from the rear portion of the plate 28 and is pivotally connected at 37 to the link 38 which is pivotally connected at its other end at 39 to the crank arm 40 which in turn is fixed upon the rock shaft 25. These parts are so constructed and arranged that upon manipulation of the handle 27 so as to shift the belt 17 from the loose pulley 15 onto the fixed pulley 16, the plate 28 will be so rotated about the pivot pin 30 that the full portion of the plate will be brought into the path of the lug 34 and thus prevent raising of the cover. When, however, the belt is moved to the loose pulley 15, the plate 28 will be so rotated as to bring the opening 29 into the path of the lug 34 and thus permit raising of the cover. A stop lug 41 is provided upon the hinge member 32 to limit opening movement of the cover by engagement with the lug 34.

Upon shifting of the belt from the loose to the fast pulley in the manner just now described, the shaft 14 will be set into operation, but the belt 9 will not be driven until frictional engagement is established between the hub 13 and the outer rim 42 of the friction pulley. Such drive connection is established when the shoes 43 carried by the pins 44 are forced outwardly by centrifugal force so as to engage with the inner surface 45 of the rim 42. The pins 44 are surrounded by the spiral springs 46, the inner ends of which are secured to the recessed lugs 47 on the hub, while the outer ends of the springs bear against the adjustable nuts 48 threaded on the outer ends of the pins. The inner ends of pins 44 seat in the recesses of the lugs 47. The springs 46 hold the shoes in frictional contact with the rim.

I have devised also means for locking the cover 4 against opening prior to the effective drive connection between the shaft 14 and the spindle 7 of the basket. Screw threaded into one end portion of the shaft 14 is the shaft 49 which is locked in such position by means of the lock nut 50. The shaft 49 has fixed thereon the worm gear 51 which has meshing engagement with the worm 52 carried by the shaft 53. Both the shafts 49 and 53 are suitably journaled in bearings formed in the casing surrounding this mechanism, such casing comprising the upper and lower sections 54 and 55, respectively. The gear 51 and the worm section on the worm 52 have a ratio of approximately one to four so that the shaft 53 is driven at approximately four times the speed of the shaft 49 and likewise the shaft 14. Fixedly mounted on the shaft 53 is the collar 56 which is provided with the pins 57 which in turn have pivotal connection with the links 58. The links 58 are pivoted at their other ends to the weights 59 which are mounted for movement along the pins 60 mounted upon the collar 61 which has free movement upon the shaft 53. Freely mounted upon the shaft 53 there is provided also a collar 62 which carries the pins 63 having pivotal connection with the links 64 which in turn are pivoted at their other ends to the weights 59. The collar 62 is formed with a groove 65 which is engaged by the inwardly extending pins of a yoke member 66 which is pivotally mounted in the casing, as indicated in Fig. 7.

The other end 67 of the yoke member 66 is pivotally connected to the shackle 68 to which is secured one end of the Bowden wire 69. The wire 69 extends through the swivel member 70 which is mounted upon the bracket arm 71 of the frame structure and the wire is surrounded by the casing 72. The other end portion of the wire 69 extends through the swivel member 73 which is mounted upon the bracket 74 upon the main frame. This end of the wire 69 is secured to the shackle member 75 which has pivotal connection at 76 with the lug 77 extending from the segmental plate 78 which in turn is pivotally mounted for rotatable adjustment about the upwardly extending boss of the plate 28.

Thus it will be seen that upon driving the fixed pulley 16, the drive of the shaft 14 will be transmitted through the shaft 49 and the worm gear 51 to the shaft 53; and that when the shaft 53 reaches a pre-determined speed, the centrifugal action of the weights 59 will cause the collar 65 to move along the shaft 53 in the manner illustrated in Fig. 6 of the drawings, thereby actuating, through the Bowden wire connection, the plate 78 so as to move the full portion thereof opposite the lug 34 to prevent opening of the cover. A spring 79 surrounding one end portion of the Bowden wire has abutment against the shackle member 68 and the swivel member 70. The casing comprising the sections 54 and 55 is suitably supported by means of the depending flange 80 which has the blocks 81 extending therefrom and bolted as at 82 to the bearing 83 of the shaft 14. It will be understood that suitable supports and bearings are provided for the different parts of the structure including the shafts and gears as well as the pulleys and other elements above described.

From the above it will be seen that with the cover closed, the basket can be rotated by shifting the belt on to the fixed pulley 16 with the simultaneous locking of the cover against opening movement because of the interception of the lug 34 by the plate 28. Then upon rotation of the shaft 14, the shaft 53 is actuated at an increased speed because of the particular worm gear connection, with the result that by means of the centrifugal device, shown in Figs. 5, 6 and 7, the Bowden wire is actuated so as to effect a second locking of the cover against opening movement. Both of these devices for locking the cover against opening are actuated prior to the drive connection being effected through the friction pulley for setting into operation the belt 9 and the spindle 7 for rotating the basket. So that when the cover has been securely locked against opening movement, the centrifugal action of the shoes 43 will have become sufficiently great to effect frictional drive connection between the shaft 14 and the pulley 12 for driving the spindle 7, the comparatively light frictional engagement caused by springs 46 permitting the shoes to slip up to this time. Then when it is desired to stop the machine, the belt will be shifted to the loose pulley 15, whereupon the centrifugal action of the shoes 43 will be decreased so as to discontinue the driving connection between the shaft 14 and the pulley 12 and the basket will stop rotation. The momentum of the rotating basket after shifting the belt to the idle pulley will be transmitted to the shaft 14 by virtue of the frictional engagement caused by the springs 46 between the shoes and the rim. Thus the cover lock control means will be actuated as long as the basket continues to rotate and for a short period thereafter, the shoes slipping over the rim after the basket comes to a stop. By the time the basket has come to a full stop, the shaft 53, which in the meantime has been rotating at a greater rate of speed than the shaft 14, will have slowed down sufficiently for the weights 59 to cause actuation of the Bowden wire so as to move the plate 78 away from the opening 29 and thus permit the opening of the cover 4. The plate 28 having been already adjusted by manipulation of the handle 27 in shifting the belt onto the loose pulley 15, the lug 34 is no longer intercepted and is free for movement through the opening 29 so that the cover 4 can be raised. At this time it is perfectly safe for the cover 4 to be raised and for the operator to insert his hands into the basket for removal of the materials contained therewithin and for re-loading of the same.

During the unloading and re-loading operations of the basket, it is impossible for the handle 27 to be manipulated so as to move the belt onto the fast pulley 16 because of the fact that the extension of the lug 34 through the opening 29 locks the plate 28 against rotary movement. Likewise the plate 78 cannot be rotated away from the position which it is shown as occupying in Fig. 1 until the cover has been lowered. Thus it will be seen that it is impossible for the machine to be started until the cover has been lowered, thereby further preventing the machine from being operated while the cover is in open position with the result that the danger incident to the insertion of the operator's hands into the rotating basket is avoided.

What I claim is:

1. In a centrifugal extractor, the combination of a rotatable basket, a guard cover for said basket, centrifugal means for automatically locking said cover closed, driving means directly connected to said centrifugal means for operating the same, and connections between said driving means and said basket and including a centrifugally controlled clutch adapted to effect driving connection between said driving means and said basket when said driving means attains a predetermined speed, the parts being so arranged that said centrifugal means locks the cover closed prior to the rotation of said basket and unlocks said cover only after the rotation of said basket has ceased.

2. In a centrifugal extractor, the combination of a rotatable basket, a guard cover for said basket, centrifugal means for automatically locking said cover closed, driving means directly connected to said centrifugal means for operating the same and including means for increasing the speed of the centrifugal means over that of the driving means, and connections between said driving means and said basket and including a centrifugally controlled clutch adapted to effect driving connection between said driving means and said basket when said driving means attains a predetermined speed, the parts being so arranged that said centrifugal means locks the cover closed prior to the rotation of said basket and unlocks said cover only after the rotation of said basket has ceased.

In testimony whereof I hereby affix my signature.

JOSEPH B. SANDO.